United States Patent [19]

Goldenberg

[11] Patent Number: 5,363,089

[45] Date of Patent: Nov. 8, 1994

[54] ELECTRONIC DEVICE HAVING MULTI-POSITION HINGED MECHANISM

[75] Inventor: Michael P. Goldenberg, Golden, Colo.

[73] Assignee: Motorola, Inc., Schaumburg, Ill.

[21] Appl. No.: 950,338

[22] Filed: Sep. 24, 1992

[51] Int. Cl.⁵ ............................................. H04M 1/02
[52] U.S. Cl. ............................. 340/825.44; 455/347;
455/349; 379/428; 379/434; 16/342
[58] Field of Search ................. 340/825.44; 455/347,
455/348, 349, 350, 351; 379/428, 433, 434;
16/342, 354, 366

[56] References Cited

U.S. PATENT DOCUMENTS

| | | | |
|---|---|---|---|
| 3,092,870 | 6/1963 | Baer | 16/354 |
| 3,402,422 | 9/1968 | Baer | 16/354 |
| 4,825,395 | 4/1989 | Kinser, Jr. et al. | 16/366 |
| 4,842,531 | 6/1989 | Takemura | 16/366 |
| 4,897,873 | 1/1990 | Beutler et al. | |
| 5,027,394 | 6/1991 | Ono et al. | 379/433 |
| 5,062,181 | 11/1991 | Bobbowski | 16/354 |
| 5,192,947 | 3/1993 | Neustein | 340/825.44 |
| 5,260,998 | 11/1993 | Takagi | 379/433 |

OTHER PUBLICATIONS

"MacIntosh Powerbooks 100, 140, and 170" by Galen Gruman, published by MacWorld, Dec. 1991, pp. 130–139.

Motorola Sales Brochure entitled "Silverlink 2000 Personal Telephone", published 1991 by Motorola, Inc. of Schaumberg, Illinois.

Hewlett Packard Sales Brochure entitled "HP95LX Palmtop PC", published 1992 by Hewlett Packard Company of Corvallis, Oregon.

*Primary Examiner*—Donald J. Yusko
*Assistant Examiner*—Brian Zimmerman
*Attorney, Agent, or Firm*—Kally A. Gardner

[57] ABSTRACT

A hinged device (100) comprises a first body portion (105) having a first end (115), wherein the first end (115) is substantially cylindrical and curved about a first axis, and wherein the first end (115) has a first plurality of cogs formed thereon substantially parallel to the first axis. The hinged device (100) further comprises a second body portion (110) having a second end (120), wherein the second end (120) is substantially cylindrical and curved about a second axis, and wherein the second end (120) has a second plurality of cogs formed thereon substantially parallel to the second axis. Securing means (125) movably secures the first body portion (105) to the second body portion (110) at the first end (115) and the second end (120), respectively, such that the first plurality of cogs meshes with the second plurality of cogs when the first body portion (105) is secured to the second body portion (110).

14 Claims, 4 Drawing Sheets

5,363,089

ELECTRONIC DEVICE HAVING MULTI-POSITION HINGED MECHANISM

FIELD OF THE INVENTION

This invention relates in general to hinged electronic devices, and more specifically to an electronic device having a hinged mechanism by which movably connected housing elements of the electronic device may be rotated into user-selectable positions.

BACKGROUND OF THE INVENTION

Many commonly known electronic devices utilize two housing elements which are movably connected by a type of hinged mechanism. The resulting arrangement of housing elements not only provides for a more compact electronic device, but also protects fragile components, such as switches or displays, which may be hidden when the electronic device is folded together.

One example of a hinged electronic device is a wireless telephone having a microphone section that may be folded together with the main telephone section. Such a hinged telephone is typically more compact than conventional wireless telephones and, therefore, may be more conveniently carried by a user. Additionally, the telephone controls may be covered, and thus protected, by the microphone section when the telephone is folded into a closed position for carrying. When the telephone is to be operated, the microphone section is rotated into an open position, in which the user may listen via an ear piece located on the main telephone section and speak into the microphone . The positioning of the microphone section is, however, generally restricted to the open or the closed position and may not be adjusted to conform to the preferences of the user speaking into the microphone.

Another type of electronic device that commonly utilizes a hinged mechanism is a laptop computer. Laptop computers, which are designed to be very compact, usually employ a "flip-up" display section. When the display section is rotated into a closed position, the display and keyboard are concealed and protected from accidental breakage. Unlike conventional hinged telephones, however, when the display section is released from the closed position, it may be rotated into many different positions. In this manner, the user may conveniently adjust the display section to a preferred position in which it is held by compression forces within the hinging mechanism. Regrettably, repeated movement of the display section may cause wear on the hinging mechanism, which, after passage of time, could begin to operate incorrectly.

Thus, what is needed is a hinged mechanism for connecting two housing elements of an electronic device such that they may be rotated into user-selectable positions. Furthermore, the hinged mechanism should not be worn by repeated movement of the housing elements.

SUMMARY OF THE INVENTION

A hinged device comprises a first body portion having a first end, wherein the first end is substantially cylindrical, curved about a first axis, and has a first plurality of cogs formed thereon substantially parallel to the first axis. A second body portion has a second end, wherein the second end is substantially cylindrical, curved about a second axis, and has a second plurality of cogs formed thereon substantially parallel to the second axis. A first cylindrical post extends from a side of the first end about the first axis, and a second cylindrical post extends from a side of the second end about the second axis. A securing device movably secures the first body portion to the second body portion at the first and second ends, respectively, such that the first and second pluralities of cogs mesh when the first body portion is secured to the second body portion.

According to a first aspect of the present invention, the first and second cylindrical posts have grooves formed therein about the first and second axes, respectively, and the securing device is an elastomeric band disposed within the grooves.

According to a second aspect of the present invention, the securing device is an elastomeric endcap for surrounding the first and second cylindrical posts to secure the first and second body portions.

DESCRIPTION OF A PREFERRED EMBODIMENT

Figure 1:
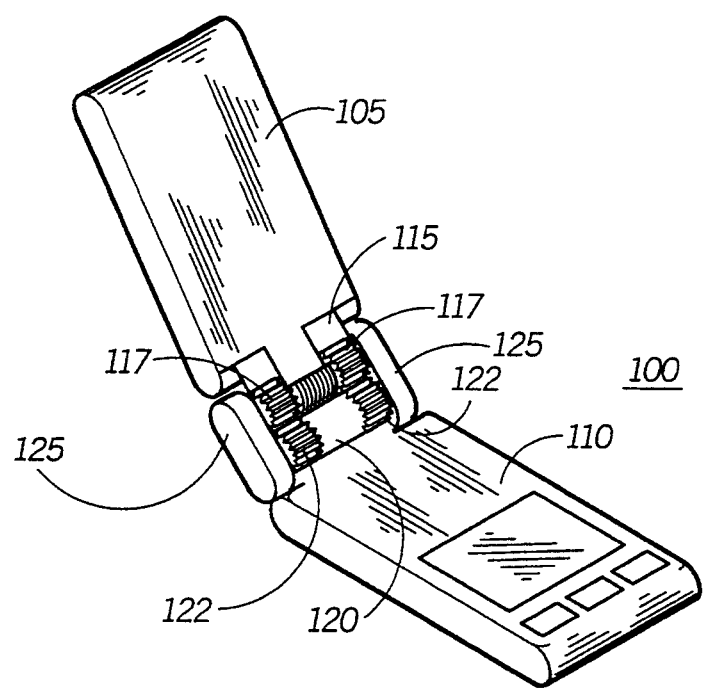
FIG. 1 is a data communication receiver utilizing a hinged mechanism in accordance with a preferred embodiment of the present invention.
Figure 2:
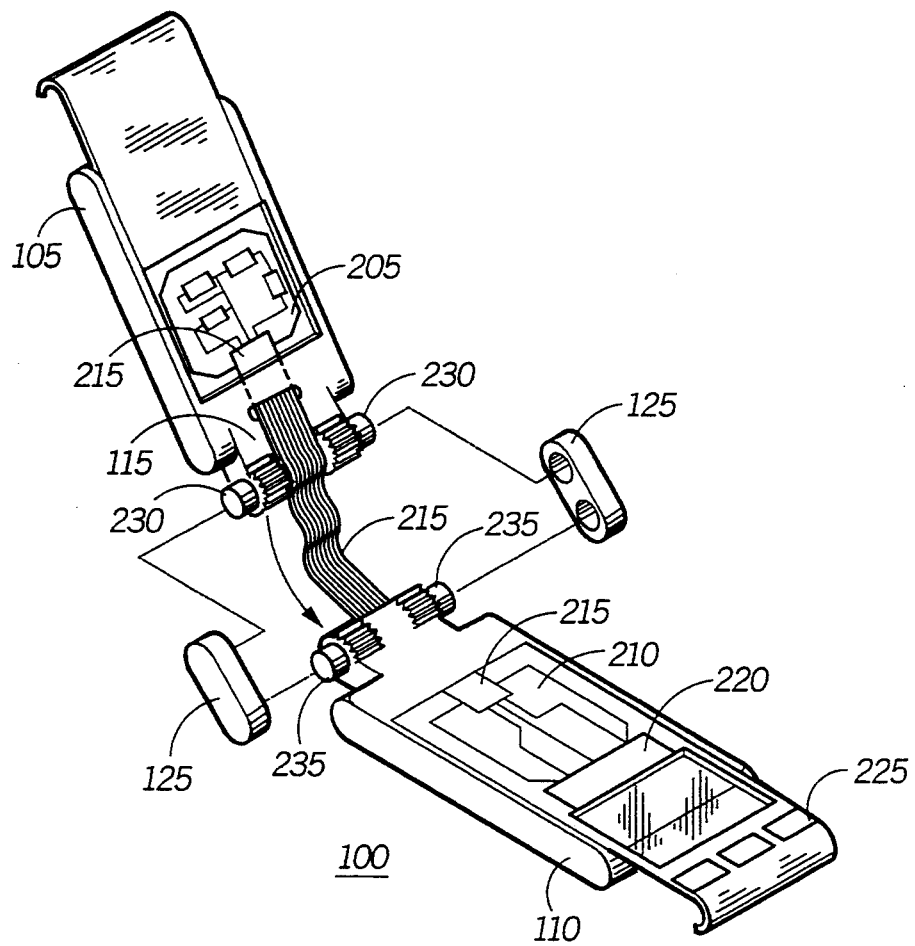
FIG. 2 is an exploded view of the data communication receiver of FIG. 1 in accordance with the preferred embodiment of the present invention.

FIG. 1 depicts a data communication receiver 100, or other such electronic device, having a hinged mechanism whereby a first body portion 105 may be rotated with respect to a second body portion 110. Preferably, a first cylindrical end 115 of the first body portion 105 is formed about a first axis and has a first plurality of cogs 117 formed thereon. Likewise, a second cylindrical end 120 of the second body portion 110 is formed about a second axis and has a second plurality of cogs 122 formed thereon. When the data communication receiver 100 is assembled, the first plurality of cogs 117 formed on the first end 115 meshes with the second plurality of cogs 122 formed on the second end 120. As will be described in greater detail below, endcaps 125 secure cylindrical posts (not shown), which are formed on either side of each of the first and second ends 115, 120, to secure and to allow pivotal rotation of the first and second body portions 105, 110. Referring next to FIG. 2, an exploded view of the data communication receiver 100 is shown. In accordance with the preferred embodiment of the present invention, a receiver board 205, on which receiver circuitry is mounted, is disposed within a cavity formed in the first body portion 105. A decoder board 210, disposed within a cavity formed in the second body portion 110, is coupled to the receiver board 205 by an electrical connector, such as a flexible circuit 215, which is soldered to contacts on the decoder board 210 and the receiver board 205. Alternatively, other methods for coupling the decoder board 210 to the receiver board 205, such as utilization of a connector, may be employed. Additionally, a display unit 220, which may be viewed by a user when the data communication receiver 100 is assembled, is located within the second body portion 110. Preferably, user actuated controls 225, which are electrically connected to the decoder board 210, may be manipulated by the user to display, on the display unit 220, selective call messages received by the receiver circuitry located within the first body portion 105.

When the data communication receiver 100 is assembled, the first plurality of cogs meshes 117 (FIG. 1) with the second plurality of cogs 122 and the flexible circuit 215 passes through a gap between the cogs, as will be described below. In accordance with the preferred embodiment of the present invention, the endcaps 125 enclose the cylindrical posts 230, 235, which are formed on either side of the first end 115 about the first axis and on either side of the second end 120 about the second axis. In this manner, the first and second body portions 105, 110 may be pivotally rotated at the first and second ends 115, 120, respectively.

Figure 3:
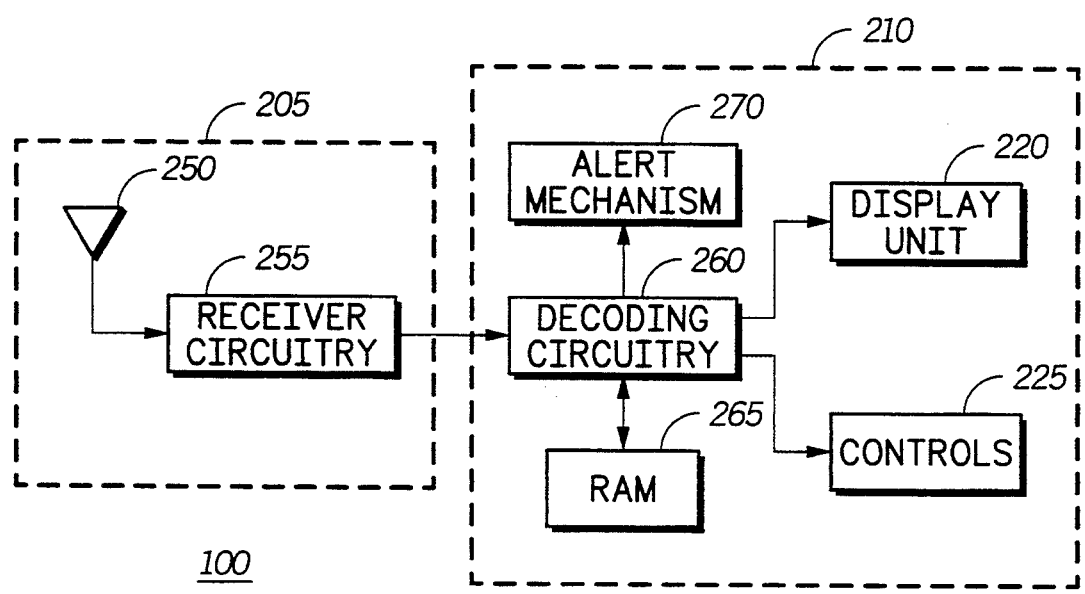
FIG. 3 is an electrical block diagram of the data communicaiton receiver of FIG. 2 in accordinace with the preferred embodiemnt of the present invention.

FIG. 3 is an electrical block diagram of the data communication receiver 100. In accordance with the preferred embodiment of the present invention, the receiver board 205 includes an antenna 250 for receiving a radio frequency (RF) signal. The receiver circuitry 255 coupled to the antenna 250 receives the RF signal from the antenna 250 and demodulates it to recover data included in the RF signal. Thereafter, the recovered data is provided, via the flexible circuit 215, to decoding circuitry 260 mounted on the decoder board 210. The decoding circuitry 260 decodes from the recovered data a selective call message, which is subsequently stored in a random access memory (RAM) 265. Further mounted on the decoder board 210 is an alert mechanism 270, which, upon reception of an instruction signal from the decoding circuitry 260, generates a sensible alert announcing reception of the selective call message. Thereafter, as described above, the user may manipulate the controls 225, in response to which the decoding circuitry 260 retrieves the selective call message from the RAM 265 and provides selective call message to the display unit 220.

Figure 4:
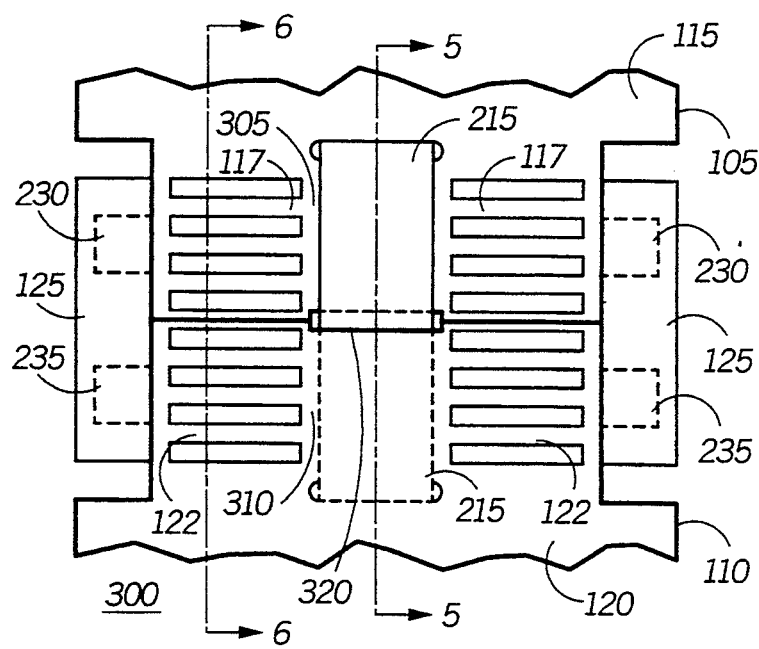
FIG. 4 is a detailed view of the hinged mechanism of FIG. 1 in accordance with the preferred embodiment of the present invention.

Referring next to FIG. 4, the hinged mechanism 300 utilized by the data communication receiver 100 is shown in more detail. As described above, the endcaps 125 enclose the cylindrical posts 230, 235 to secure the first end 115 to the second end 120 in a position wherein the first plurality cogs 117 mesh with the second plurality of cogs 122. In accordance with the preferred embodiment of the present invention, a first smooth area 305, wherein no cogs are present, is formed about the first axis in a central region of the first end 115. In like manner, a second smooth area 310 is formed about the second axis in a central region of the second end 120. When the data communication receiver 100 is assembled, the smooth areas 305, 310 form a gap 320 between the cogs through which the flexible circuit 215 is fed, as may be better understood by referring to FIG. 5.

Figure 5:
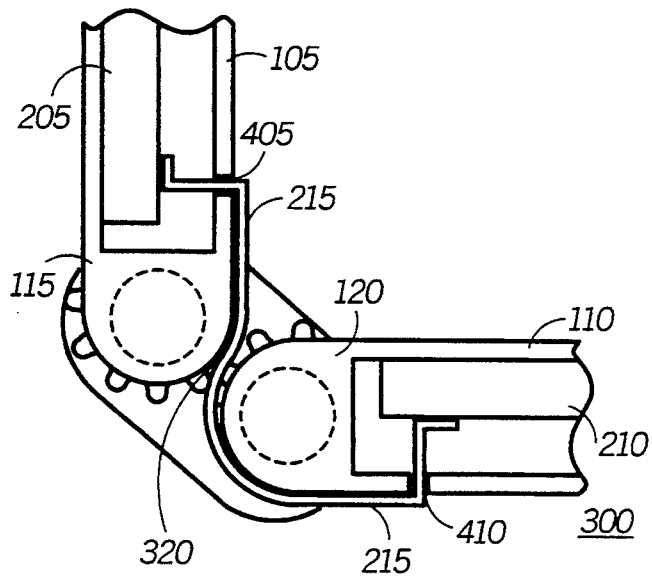
FIG. 5 is a side view of the hinged mechanism of FIG. 4 along line 5—5 in accordance with the preferred embodiment of the present invention.

FIG. 5 is a cutaway view of the hinged mechanism 300 along the line 5—5. In accordance with the preferred embodiment of the present invention, the first smooth area 305 (FIG. 4) has a radius less than that of the areas of the first end 115 on which cogs are formed. The second smooth area 310 (FIG. 4) preferably has a radius equivalent to that of the first smooth area 305. Therefore, when the first plurality of cogs 117 (FIG. 4) mesh with the second plurality of cogs 122, a gap 320 remains between the first smooth area 305 and the second smooth area, as shown. The flexible circuit 215, which electrically couples the receiver board 205 to the decoder board 210, is fed through a first opening 405 formed in an inside surface of the first body portion 105. Preferably, the flexible circuit 215 is of sufficient length to wind along the first smooth area 305, through the gap 320, and along the second smooth area 310. The flexible circuit 215 is then fed through a second opening 410 in an outside surface of the second body portion 110. As described above, the radii of the first smooth area 305 equals that of the second smooth area 310. Therefore, as the first and second body portions 105, 110 are rotated, the flexible circuit 215 remains taut, without being strained. In this manner, the hinged mechanism 300 according to the present invention prevents stresses which could result in wear on the flexible circuit 215, unlike some prior art hinged mechanisms which may twist or strain electrical connections.

Figure 6:
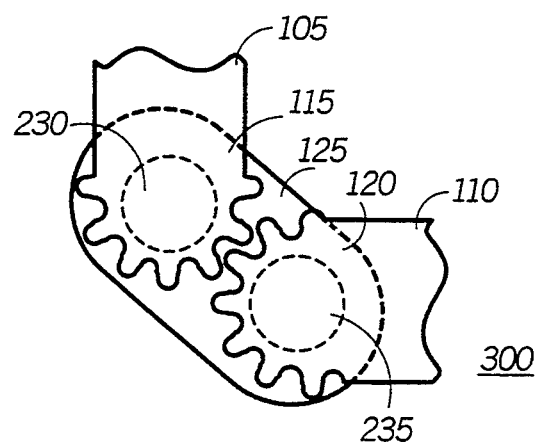
FIG. 6 is a side view of the hinged mechanism of FIG. 4 along line 6—6 in accordance with the preferred embodiment of the present invention.

Referring next to FIG. 6, a cutaway view of the hinged mechanism 300 along line 6—6 is shown. In accordance with the preferred embodiment of the present invention, the endcaps 125 enclose the cylindrical posts 230, 235 such that the first plurality of cogs 117 (FIG. 4) are held tightly against the second plurality of cogs 122. Preferably, the endcaps 125 are formed from an elastomeric material, such as urethane, to counteract any small dimensional differences, which commonly result from manufacturing tolerances, in the hinged mechanism 300, thereby providing for a smooth rotation. Furthermore, because the cogs are held tightly together by the elastomeric endcaps 125, the first and second ends 115, 120 are prevented from slipping during rotation, thus preventing wear on the hinged mechanism 300. As a result, the first and second body portions 105, 110 may be rotated into a variety of different positions and held securely therein by the hinged mechanism 300, as described above. Therefore, in accordance with the preferred embodiment of the present invention, the data communication receiver 100, unlike conventional data communication receivers, may assume multiple form factors, as illustrated in FIGS. 7 through 10.

Figure 7:
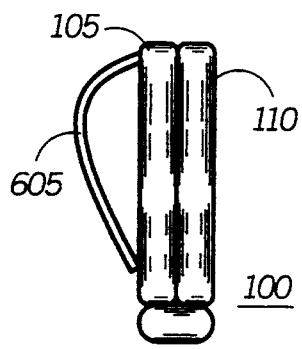
FIG. 7 depicts a position in which the data communication receiver of FIG. 1 may be worn on a belt in accordance with the preferred embodiment of the present invention.

FIG. 7 is a side orthogonal view depicting a first form factor in which the data communication receiver 100 may be carried by the user on an article of clothing, such as a belt. In this formation, a detachable belt clip 605 is mounted on the first body portion 105 such that the data communication receiver 100 may be secured to the user's belt. The folding of the second body portion 110 into contact with the first body portion 105 not only provides for a more compact arrangement, but also protects the display unit 220 (FIG. 3) and the user actuated controls 225. When the user receives a selective call message, the data communication receiver 100 is rotated into a second form factor depicted in FIG. 8.

Figure 8:
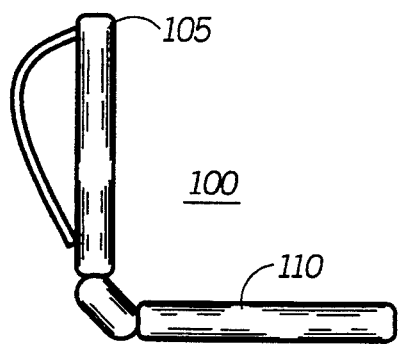
FIG. 8 depicts a position in which a body portion of the data communication receiver of FIG. 7 may be rotated, in accordance with the preferred embodiment of the present invention, such that a user may display a received selective call message.

FIG. 8 illustrates the data communication receiver 100 after the second body portion 110 has been rotated away from the first body portion 105 to reveal the display unit 220 (FIG. 3) and the controls 225. While the data communication receiver 100 is in this position, the user may manipulate the controls 225 to display the selective call message on the display unit 220, which is visible although the data communication receiver 100 remains secured to the user's belt by the belt clip 605. Typical data communication receivers, unlike the data communication receiver 100 in accordance with the preferred embodiment of the present invention, often must be removed from the belt so that the user can read a received message, thereby inconveniencing the user.

Figure 9:
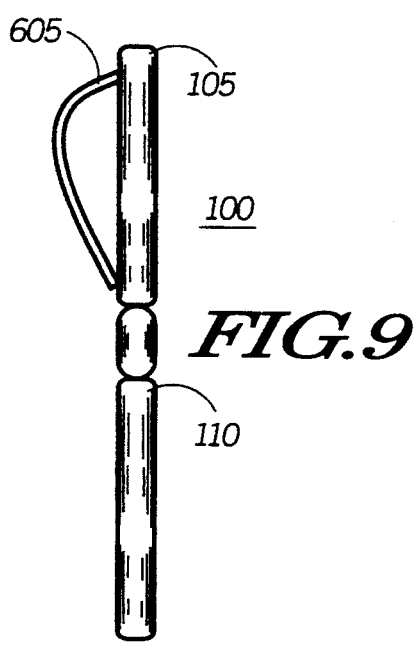
FIG. 9 depicts a position in which the data communication receiver of FIG. 1 may be worn in a shirt pocket in accordance with the preferred embodiment of the present invention.

Referring next to FIG. 9, the data communication receiver 100 has been rotated into a "pen" form factor, in which the first and second body portions 105, 110 are substantially parallel. This form factor may prove useful for a user who often carries pens or pencils in a shirt pocket. The belt clip 605 may be secured to the shirt pocket, just as a clip on a pen is secured to the shirt pocket. This form factor allows the user to conveniently carry all of his implements, i.e., pen, pencil, and data communication receiver 100, in one location, i.e., the shirt pocket.

Figure 10:
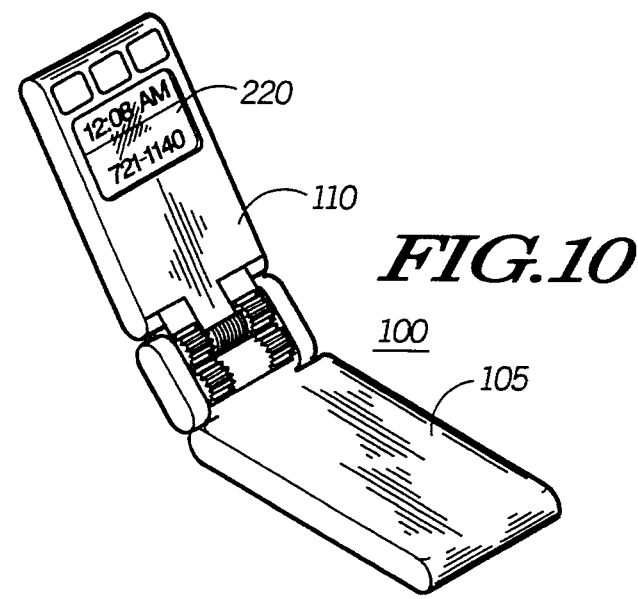
FIG. 10 depicts a position in which the data communicant receiver of FIG. 1 may be set on a desk or table top in accordance with the preferred embodiment of the present invention.

A still further form factor is illustrated in FIG. 10, which is a side orthogonal view depicting an arrangement in which the data communication receiver 100 may be set on a desk or a table top. In such an arrangement, the detachable belt clip 605 is removed from the first body portion 105. The first body portion 105 is set flat on the desk or table top, and the second body portion 110 is rotated so that the display unit 220 is visible to the user. As described above, the hinged mechanism 300 (FIG. 6) according to the present invention will hold the second body portion 110 in the desired position, in this case the "desk" position. In this position, when the data communication receiver 100 includes a real time clock having an audible alarm feature, the user may further employ the data communication receiver 100 as a travel alarm.

The data communication receiver 100 having the hinged mechanism 300 in accordance with the preferred embodiment of the present invention may be positioned in any number of desired form factors by the user. However, alternate embodiments of the hinged mechanism 300, such as that depicted in FIG. 11, may also be utilized by the data communication receiver 100.

Figure 11:
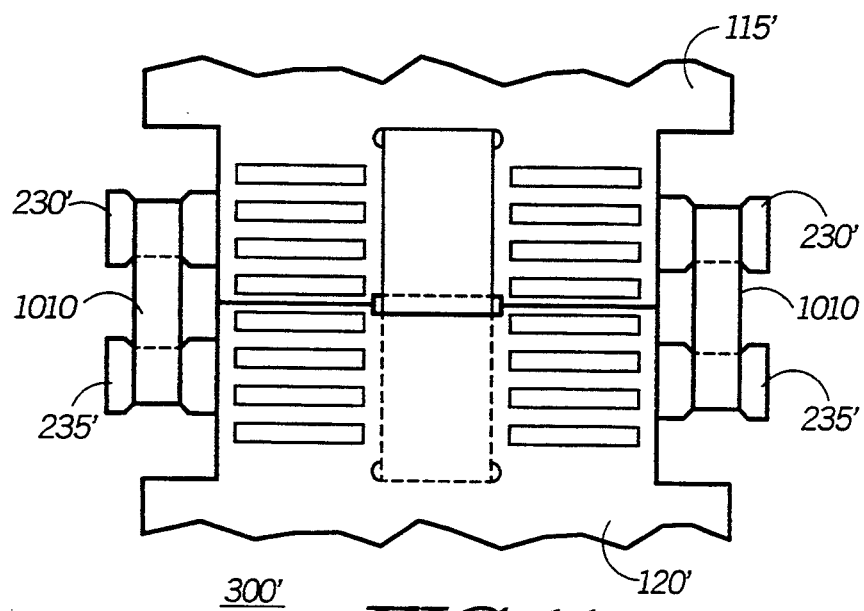
FIG. 11 is an illustration of a hinging mechanism in accordance with an alternate embodiment of the present invention which may be utilized by the data communication receiver of FIG. 1.

FIG. 11 illustrates an alternate hinged mechanism 300' which may be employed by the data communication receiver 100. The hinged mechanism 300' operates similarly to the hinged mechanism 300 in accordance with the preferred embodiment of the present invention, but the endcaps 125 (FIG. 4) are not utilized. In this alternate embodiment, the cylindrical posts 230', 235' each have grooves formed therein. Elastomeric bands 1010 are disposed within the grooves to secure the first end 115' to the second end 120' such that the cogs on the first end 115' mesh with the cogs on the second end 120'. As in the preferred embodiment, the elastomeric bands 1010 hold the cylindrical posts 230', 235' tightly enough that rotation is smooth regardless of small dimensional differences in the hinged mechanism 300'.

In summary, the data communication receiver according to the present invention utilizes a hinged mechanism which provides for the rotation of one body portion with respect to the other body portion. Furthermore, the design of the hinged mechanism is such that the data communication receiver may be rotated and securely held in numerous positions, thereby providing for multiple form factors, such as "pen" or "desktop" form factors. The data communication receiver may be conveniently arranged by the user in these different form factors simply by rotating the body portions. Additionally, the hinged mechanism utilized by the data communication receiver prevents wear on both the hinge itself and the electrical connections between the body portions. As a result, the hinged mechanism operates smoothly and correctly even after repeated use by the user.

It may be appreciated by now that there has been provided a hinged mechanism by which two body portions of an electronic device may be rotated into user-selectable positions. Furthermore, the hinged mechanism provided is not worn by repeated use.

What is claimed is:

1. A hinged electronic device comprising:
a first body portion having a first end formed about a first axis, the first body portion including a first electronic circuit disposed therein, wherein the first end is substantially cylindrical, includes a first geared portion having a first plurality of cogs formed thereon substantially parallel to the first axis, and has a first cylindrical post extending from a side thereof about the first axis, the first cylindrical post having a groove formed therein about the first axis;
a second body portion having a second end formed about a second axis, the second body portion including a second electronic circuit disposed therein, wherein the second end is substantially cylindrical, includes a second geared portion having a second plurality of cogs formed thereon substantially parallel to the first axis, and has a second cylindrical post extending from a side thereof abut the second axis, the second cylindrical post having a groove formed therein about the second axis;
coupling means for electrically coupling the first and second electronic circuits; and
an elastomeric band disposed within the grooves formed in the first and second cylindrical posts for movably securing the first cylindrical post to the second cylindrical post such that the first and second pluralities of cogs mesh when the first body portion is secured to the second body portion by the first and second cylindrical posts.

2. The hinged electronic device in accordance with claim 1, wherein:
the first end further includes a first smooth portion having a first radius less than that of the first geared portion;

the second end further includes a second smooth portion having a second radius less than that of the second geared portion, wherein the second radius is substantially equivalent to the first radius;

the first smooth portion aligns with the second smooth portion such that a gap is formed therebetween when the first body portion is secured to the second body portion at the first end and the second end, respectively; and the coupling means is a flexible circuit that passes through the gap formed between the first smooth portion and the second smooth portion to electrically couple the first electronic circuit to the second electronic circuit.

3. A hinged device comprising:

a first body portion having a first end, wherein the first end is substantially cylindrical, curved about a first axis, and has a first plurality of cogs formed thereon substantially parallel to the first axis;

a second body portion having a second end, wherein the second end is substantially cylindrical, curved about a second axis, and has a second plurality of cogs formed thereon substantially parallel to the second axis;

a first cylindrical post extending from a side of the first end and formed about the first axis;

a second cylindrical post extending from a side of the second end and formed about the second axis; and an elastomeric endcap for surrounding the first and second cylindrical posts such that the first and second pluralities of cogs mesh during rotation of the hinged device.

4. A hinged device comprising:

a first body portion having a first end, wherein the first end is substantially cylindrical, curved about a first axis, and has a first plurality of cogs formed thereon substantially parallel to the first axis;

a second body portion having a second end, wherein the second end is substantially cylindrical, curved about a second axis, and has a second plurality of cogs formed thereon substantially parallel to the second axis;

a first cylindrical most extending from a side of the first end about the first axis, the first cylindrical post having a groove formed therein about the first axis;

a second cylindrical post extending from a side of the second end about the second axis, the second cylindrical post having a groove formed therein about the second axis; and an elastomeric band disposed within the grooves formed in the first and second cylindrical posts for movably securing the first body portion to the second body portion at the first and second ends, respectively, such that the first and second pluralities of cogs mesh when the first body portion is secured to the second body portion.

5. A hinged electronic device comprising:

a first body portion having a first end formed about a first axis, the first body portion including a first electronic circuit disposed therein, wherein the first end is substantially cylindrical, includes a first geared portion having a first plurality of cogs formed thereon substantially parallel to the first axis, and has a first cylindrical post extending from a side thereof about the first axis;

a second body portion having a second end formed about a second axis, the second body portion including a second electronic circuit disposed therein, wherein the second end is substantially cylindrical, includes a second geared portion having a second plurality of cogs formed thereon substantially parallel to the first axis, and has a second cylindrical post extending from a side thereof about the second axis:

coupling means for electrically coupling the first and second electronic circuits; and an elastomeric endcap for surrounding the first and second cylindrical post posts such that the first and second pluralities of cogs mesh during rotation of the hinged electronic device.

6. The hinged electronic device in accordance with claim 5, wherein:

the first end further includes a first smooth portion having a first radius less than that of the first geared portion;

the second end further includes a second smooth portion having a second radius less than that of the second geared portion, wherein the second radius is substantially equivalent to the first radius;

the first smooth portion aligns with the second smooth portion such that a gap is formed therebetween when the first body portion is secured to the second body portion at the first end and the second end, respectively; and the coupling means is a flexible circuit that passes through the gap formed between the first smooth portion and the second smooth portion to electrically couple the first electronic circuit to the second electronic circuit.

7. A data communication receiver for receiving selective call messages, comprising:

a first body portion having a first end and having receiver circuitry disposed therein, wherein the first end is substantially cylindrical, curved about a first axis, and includes a first geared portion having a first plurality of cogs formed thereon substantially parallel to the first axis, and wherein the first end further includes a first cylindrical post extending from a first side thereof about the first axis and a second cylindrical post extending from a second side thereof about the first axis;

a second body portion having a second end and including electronic circuitry disposed therein, wherein the second end is substantially cylindrical, curved about a second axis, and includes a second geared portion having a second plurality of cogs formed thereon substantially parallel to the second axis, and wherein the second end further includes a third cylindrical post extending from a first side thereof about the second axis and a fourth cylindrical post extending from a second side thereof about the second axis;

coupling means for electrically coupling the receiver circuitry to the electronic circuitry disposed within the second body portion;

a first elastomeric endcap having cavities formed therein, the first and third cylindrical posts being disposed within the cavities formed in the first elastomeric endcap; and a second elastomeric endcap having cavities formed therein, the second and fourth cylindrical posts being disposed within the cavities formed in the second elastomeric endcap, wherein the first and second elastomeric endcaps secure the first body portion to the second body portion such that the first and second pluralities of cogs mesh during pivotal rotation of the data communication receiver.

8. The data communication receiver in accordance with claim 7, wherein:
the first end further includes a first smooth portion having a first radius less than that of the first geared portion;
the second end further includes a second smooth portion having a second radius less than that of the second geared portion, wherein the second radius is substantially equivalent to the first radius;
the first smooth portion aligns with the second smooth portion such that a gap is formed therebetween when the first body portion is secured to the second body portion at the first end and the second end, respectively; and
the coupling means is a flexible circuit that passes through the gap formed between the first smooth portion and the second smooth portion to electrically couple the receiver circuitry to the electronic circuitry disposed within the second body portion.

9. The data communication receiver in accordance with claim 7, wherein the receiver circuitry includes at least one electronic circuit for receiving the selective call messages.

10. The data communication receiver in accordance with claim 7, wherein the electronic circuitry disposed within the second body portion includes:
a display device coupled by the coupling means to the receiver circuitry for displaying the selective call messages; and
user actuated controls coupled to the display device for providing user initiated control signals to the data communication receiver.

11. A data communication receiver for receiving selective call messages, comprising:
a first body portion having a first end and having receiver circuitry disposed therein, wherein the first end is substantially cylindrical, curved about a first axis, and includes a first geared portion having a first plurality of cogs formed thereon substantially parallel to the first axis, and wherein the first end further includes a first cylindrical post extending from a first side thereof about the first axis and a second cylindrical post extending from a second side thereof about the first axis, the first and second cylindrical posts having grooves formed therein about the first axis;
a second body portion having a second end and including electronic circuitry disposed therein, wherein the second end is substantially cylindrical, curved about a second axis, and includes a second geared portion having a second plurality of cogs formed thereon substantially parallel to the second axis, and wherein the second end further includes a third cylindrical post extending from a first side thereof about the second axis and a fourth cylindrical post extending from a second side thereof about the second axis, the third and fourth cylindrical posts having grooves formed therein about the second axis;
coupling means for electrically coupling the receiver circuitry to the electronic circuitry disposed within the second body portion; and
first and second elastomeric bands disposed within the grooves formed in the first and third cylindrical posts, respectively, and within the grooves formed in the second and fourth cylindrical posts, respectively, such, that the first and second elastomeric bands secure the first body portion to the second body portion such that the first and second pluralities of cogs mesh during pivotal rotation of the data communication receiver.

12. The data communication receiver in accordance with claim 11, wherein:
the first end further includes a first smooth portion having a first radius less than that of the first geared portion;
the second end further includes a second smooth portion having a second radius less than that of the second geared portion, wherein the second radius is substantially equivalent to the first radius;
the first smooth portion aligns with the second smooth portion such that a gap is formed therebetween when the first body portion is secured to the second body portion at the first end and the second end, respectively; and
the coupling means is a flexible circuit that passes through the gap formed between the first smooth portion and the second smooth portion to electrically couple the receiver circuitry to the electronic circuitry disposed within the second body portion.

13. The data communication receiver in accordance with claim 11, wherein the receiver circuitry includes at least one electronic circuit for receiving the selective call messages.

14. The data communication receiver in accordance with claim 11, wherein the electronic circuitry disposed within the second body portion includes:
a display device coupled by the coupling means to the receiver circuitry for displaying the selective call messages; and
user actuated controls coupled to the display device for providing user initiated control signals to the data communication receiver.

* * * * *